US009419971B2

(12) United States Patent
Cudak et al.

(10) Patent No.: US 9,419,971 B2
(45) Date of Patent: Aug. 16, 2016

(54) SECURELY UNLOCKING A DEVICE USING A COMBINATION OF HOLD PLACEMENT AND GESTURE

(71) Applicant: International Business Machines Corporation, Armonk, NY (US)

(72) Inventors: Gary D. Cudak, Creedmoor, NC (US); Christopher J. Hardee, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/325,855

(22) Filed: Jul. 8, 2014

(65) Prior Publication Data

US 2016/0014260 A1    Jan. 14, 2016

(51) Int. Cl.
*H04M 1/66* (2006.01)
*H04L 29/06* (2006.01)
(Continued)

(52) U.S. Cl.
CPC ........ *H04L 63/0861* (2013.01); *G06F 3/04883* (2013.01); *H04M 1/67* (2013.01); *H04W 12/06* (2013.01); *H04M 2250/22* (2013.01)

(58) Field of Classification Search
CPC . H04W 12/06; H04W 12/12; H04W 52/0254; H04M 1/72519; H04M 1/72583; H04M 63/0861; H04M 2250/22; H04M 1/67; H04M 12/06; H04L 63/0861; G06F 3/04883; G06F 21/36; G06F 3/0488; G06F 1/626; G06F 1/1643; G06F 1/684; G06F 1/1694; G06F 21/31; G06F 21/74
USPC .................................. 455/566, 411
See application file for complete search history.

(56) References Cited

U.S. PATENT DOCUMENTS 4,484,784 A * 11/1984 Leiber ..................... B60T 8/885
                                                    303/116.1
4,672,853 A *  6/1987 Hickox ..................... G01L 9/065
                                                    73/708
(Continued)

FOREIGN PATENT DOCUMENTS

EP        2506183 A1    10/2012
WO    WO2012123788 A1    9/2012

OTHER PUBLICATIONS

"U.S. Appl. No. 14/326,850—Office Action", mail date: Jul. 27, 2015, 19 pages.

*Primary Examiner* — Mahendra Patel
(74) *Attorney, Agent, or Firm* — Jeffrey L. Streets (57) ABSTRACT

A computer program product includes a computer readable storage medium having program instructions embodied therewith, where the program instructions are executable by a processor to cause the processor to perform a method. The method includes receiving input from a touchscreen of a mobile electronic device, and receiving input from a plurality of contact sensors of the mobile electronic device, wherein the contact sensors are positioned along an external surface of the mobile electronic device. The method further includes unlocking access to the resources of the mobile electronic device in response to receiving input from the touchscreen meeting predetermined touchscreen input criteria and receiving input from the plurality of contact sensors meeting predetermined contact sensors input criteria. Optionally, the method may further receive input from a camera of the mobile electronic device, and only unlock the device in response to further receiving input from the camera meeting predetermined finger position criteria.

16 Claims, 4 Drawing Sheets

(51) Int. Cl.
  *H04W 12/06* (2009.01)
  *G06F 3/0488* (2013.01)
  *H04M 1/67* (2006.01)

(56) References Cited

U.S. PATENT DOCUMENTS

| | | | |
|---|---|---|---|
| 7,302,570 B2 | 11/2007 | Beard et al. | |
| 8,266,710 B2 | 9/2012 | Al-Azzawi | |
| 8,447,273 B1* | 5/2013 | Friedlander | H04M 1/72577 382/115 |
| 8,472,665 B2* | 6/2013 | Hildreth | G06F 1/1626 382/103 |
| 8,914,875 B2* | 12/2014 | Matus | 726/17 |
| 9,021,270 B1* | 4/2015 | Byers | H04L 63/0861 713/186 |
| 2012/0126941 A1* | 5/2012 | Coggill | G06F 21/36 340/5.54 |
| 2013/0042209 A1* | 2/2013 | de Leon | G06F 3/017 715/863 |
| 2013/0154947 A1* | 6/2013 | Abrams | G06F 1/1626 345/173 |
| 2013/0297513 A1 | 11/2013 | Kirillin et al. | |
| 2013/0311768 A1 | 11/2013 | Fosmark et al. | |
| 2013/0347102 A1* | 12/2013 | Shi | G06F 3/04883 726/19 |
| 2014/0009378 A1* | 1/2014 | Chew | G06F 3/017 345/156 |
| 2014/0055387 A1* | 2/2014 | Yeh | 345/173 |
| 2015/0007306 A1* | 1/2015 | Yang | G06F 21/31 726/18 |

* cited by examiner

SECURELY UNLOCKING A DEVICE USING A COMBINATION OF HOLD PLACEMENT AND GESTURE

BACKGROUND

1. Field of the Invention

The present invention relates to security and authentication of a user attempting to gain access to a resource of an electronic device, such as a mobile communications device.

2. Background of the Related Art

Mobile communication devices, such as telephones, are an integral part of everyday life in a modern society. Telephones that are connected to a land line are even on the decline, as people become accustomed to having a mobile phone with them at all times. The functions and features available on a mobile phone continue to expand, including apps, a web browser, a camera, full physical or virtual keypads, touchscreens, local area networking wireless connectivity and personal area network wireless connectivity, texting and email, and more.

Furthermore, a mobile communication device may store private information, such as pictures, passwords, payment information and other information that a user may not want shared. Security measures may be implemented on the mobile communication device in order to prevent others from gaining access to the private information or otherwise using the features of the device without authorization. Such security measures may include successful entry of a previously stored password or biometric input, such as facial recognition or finger print recognition. Furthermore, the strength of a password may be increased by requiring more characters and a variety of character types. For example, some security systems will require that a password include a minimum of eight characters, including at least one capital letter, one number and one special character.

BRIEF SUMMARY

One embodiment of the present invention provides a computer program product comprising a computer readable storage medium having program instructions embodied therewith, where the program instructions are executable by a processor to cause the processor to perform a method. The method comprises receiving input from a touchscreen of a mobile electronic device, and receiving input from a plurality of contact sensors of the mobile electronic device, wherein the contact sensors are positioned along an external surface of the mobile electronic device. The method further comprises unlocking access to the resources of the mobile electronic device in response to receiving input from the touchscreen meeting predetermined touchscreen input criteria and receiving input from the plurality of contact sensors meeting predetermined contact sensors input criteria.

Another embodiment of the present invention provides a computer program product comprising a computer readable storage medium having program instructions embodied therewith, where the program instructions are executable by a processor to cause the processor to perform a method. The method comprises receiving input from a touchscreen of a mobile electronic device, receiving input from a plurality of contact sensors of the mobile electronic device, wherein the contact sensors are positioned along an external surface of the mobile electronic device, and receiving input from a camera of the mobile electronic device. The method further comprises unlocking access to the resources of the mobile electronic device in response to receiving input from the touchscreen meeting predetermined touchscreen input criteria, receiving input from the plurality of contact sensors meeting predetermined contact sensors input criteria, and receiving input from the camera meeting predetermined finger position criteria.

DETAILED DESCRIPTION

One embodiment of the present invention provides a method comprising receiving input from a touchscreen of a mobile electronic device, and receiving input from a plurality of contact sensors of the mobile electronic device, wherein the contact sensors are positioned along an external surface of the mobile electronic device. The method further comprises unlocking access to the resources of the mobile electronic device in response to receiving input from the touchscreen meeting predetermined touchscreen input criteria and receiving input from the plurality of contact sensors meeting predetermined contact sensors input criteria.

The predetermined touchscreen input criteria may include a predetermined touch gesture, such as a predetermined multi-touch gesture. One example of a touch gesture is a swipe, wherein a finger touches the touchscreen and slides along the surface of the touchscreen for a distance before disengaging from the touchscreen. Accordingly a swipe may traverse various paths as determined by a user. A multi-touch gesture may also be a swipe, wherein multiple fingers or points of contact are made with a touchscreen and slid along the surface of the touchscreen for a distance before disengaging from the touchscreen. Furthermore, the predetermined touchscreen input criteria may include a predetermined touch gesture, or a predetermined multi-touch gesture, in a predetermined position of the touchscreen.

The predetermined contact sensors input criteria may include a predefined device holding pattern. Typically, a user will hold the mobile electronic device with one hand and provide touchscreen input with the other hand. Accordingly, a plurality of contact sensors may be disposed on the surface of the mobile electronic device in positions that are likely to be contacted by a user's hand when holding the device. It is expected that variations in hand size, finger width and length, hand strength and personal preference will lead one user to hold their mobile electronic device in a different manner than another user. By providing a plurality of contact sensors, an authorized user's unique holding pattern may be measured as a plurality of contact points. Optionally, the plurality of contact sensors may be pressure transducers, such that the pressure applied at each contact sensor may also be measured.

Embodiments of the present invention may further include steps for establishing the predetermined touchscreen input criteria and the predetermined contact sensors input criteria. In one example, the mobile electronic device is placed in a security configuration mode. Typically, this can only be done by an authorized user that has already been authenticated to the mobile electronic device. While the mobile electronic device is in the security configuration mode, the authorized user holds the mobile electronic device in a manner that engages a plurality of the contact sensors and performs a touch gesture on the touchscreen. The predetermined touchscreen input criteria and the predetermined contact sensors input criteria is then automatically stored. Subsequently, a user will unlock the mobile electronic device by repeating the same holding pattern and touchscreen gesture that were used during the security configuration mode.

Optionally, the method may include unlocking access to a subset of the resources of the mobile electronic device in response to receiving input from the touchscreen meeting second predetermined touchscreen input criteria and receiving input from the plurality of contact sensors meeting second predetermined contact sensors input criteria. Second predetermined touchscreen input criteria and second predetermined contact sensors input may be stored in the same manner described above for a second user. Since two individual users are expected to have different holding patterns and select different touch gestures, the system can accommodate separate unlocking criteria for each user. For example, a first user may be authorized to have full access to all resources of the mobile electronic device, while a second user only have authorization to access a subset of those resources.

Another embodiment of the present invention provides a method comprising receiving input from a touchscreen of a mobile electronic device, receiving input from a plurality of contact sensors of the mobile electronic device, wherein the contact sensors are positioned along an external surface of the mobile electronic device, and receiving input from a camera of the mobile electronic device. The method further comprises unlocking access to the resources of the mobile electronic device in response to receiving input from the touchscreen meeting predetermined touchscreen input criteria, receiving input from the plurality of contact sensors meeting predetermined contact sensors input criteria, and receiving input from the camera meeting predetermined finger position criteria.

In this embodiment, the predetermined touchscreen input criteria may include any of the aspects described above, and the predetermined contact sensors input criteria may include any of the aspects described above. However, this embodiment includes the user of a camera to capture an image of the relative position of fingers during the touch gesture input. Optionally, the predetermined finger position criteria includes a predetermined configuration of fingers that are not involved in the predetermined touchscreen gesture. Image analysis may be used on the input from the camera to identify the finger position.

Embodiments of the present invention may further include steps for establishing the predetermined touchscreen input criteria, the predetermined contact sensors input criteria, and the predetermined finger position criteria. For example, the mobile electronic device may be placed in a security configuration mode. While the mobile electronic device is in the security configuration mode, an authorized user holds the mobile electronic device in a manner that engages a plurality of the contact sensors, performs a touch gesture on the touchscreen, and positions fingers in view of the camera. Accordingly, the method stores input received from the contact sensors during the security configuration mode as the predetermined contact sensors input criteria, stores the input received from the touchscreen during the security configuration mode as the predetermined touchscreen input criteria, and stores the input received from the camera during the security configuration mode as the predetermined finger position criteria. Subsequently, a user will unlock the mobile electronic device by repeating the same holding pattern, touchscreen gesture and finger position that were used during the security configuration mode.

A further embodiment of the present invention provides a computer program product comprising a computer readable storage medium having program instructions embodied therewith, where the program instructions are executable by a processor to cause the processor to perform a method. The method comprises receiving input from a touchscreen of a mobile electronic device, and receiving input from a plurality of contact sensors of the mobile electronic device, wherein the contact sensors are positioned along an external surface of the mobile electronic device. The method further comprises unlocking access to the resources of the mobile electronic device in response to receiving input from the touchscreen meeting predetermined touchscreen input criteria and receiving input from the plurality of contact sensors meeting predetermined contact sensors input criteria.

A still further embodiment of the present invention provides a computer program product comprising a computer readable storage medium having program instructions embodied therewith, where the program instructions are executable by a processor to cause the processor to perform a method. The method comprises receiving input from a touchscreen of a mobile electronic device, receiving input from a plurality of contact sensors of the mobile electronic device, wherein the contact sensors are positioned along an external surface of the mobile electronic device, and receiving input from a camera of the mobile electronic device. The method further comprises unlocking access to the resources of the mobile electronic device in response to receiving input from the touchscreen meeting predetermined touchscreen input criteria, receiving input from the plurality of contact sensors meeting predetermined contact sensors input criteria, and receiving input from the camera meeting predetermined finger position criteria.

The foregoing computer program products may further include computer readable program code for implementing or initiating any one or more aspects of the methods described herein. Accordingly, a separate description of the methods will not be duplicated in the context of a computer program product.

Figure 1:
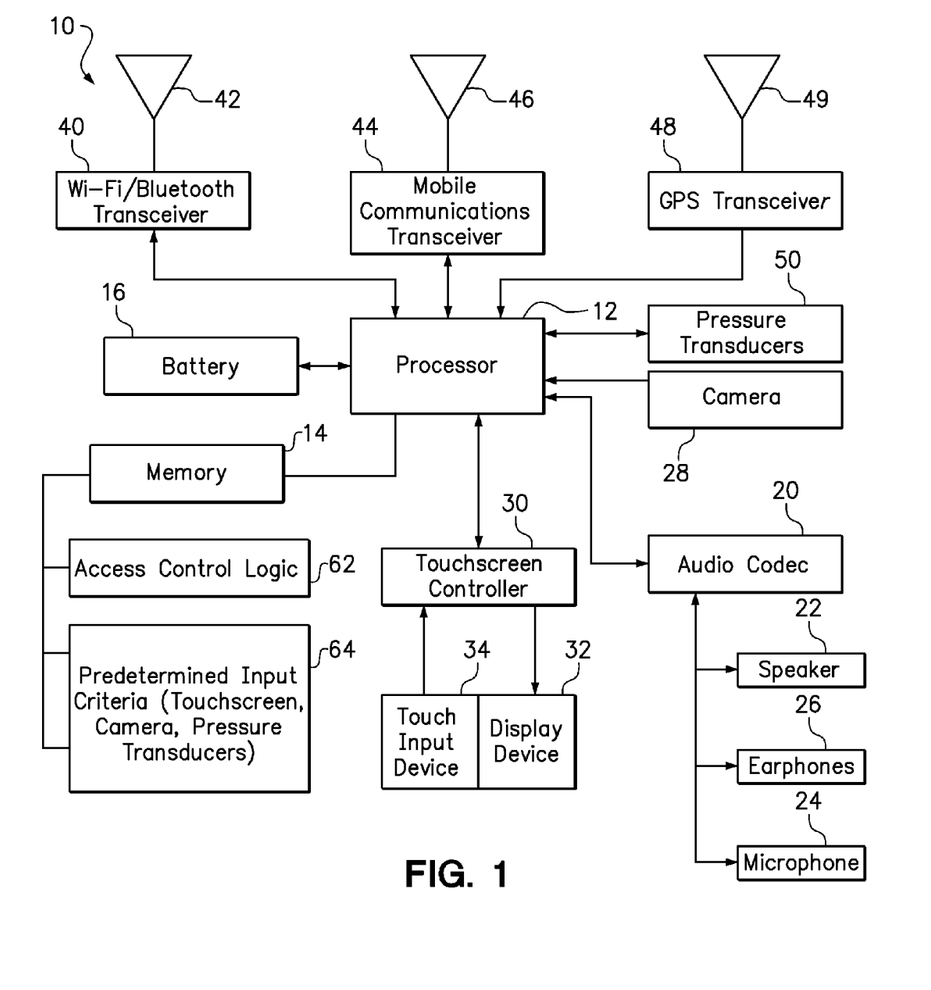
FIG. 1 is a block diagram of a communication device that may implement embodiments of the present invention.

FIG. 1 is a block diagram of the components in one example of a communication device 10, such as a mobile communication device or smart phone, capable of implementing embodiments of the present invention. The mobile communication device 10 may include a processor 12, memory 14, a battery 16, and an audio codec 20 coupled to a speaker 22, a microphone 24, and an earphone jack 26. The mobile communication device 10 may further include a camera 28, a set of pressure transducers 50, and a touchscreen controller 30 that provides a graphical output to the display device 32 and an input from a touch input device 34. Collectively, the display device 32 and touch input device 34 may be referred to as a touchscreen.

The mobile communication device 10 may also include a local a networking wireless connectivity and/or personal area network wireless transceiver 40 and corresponding antenna 42 allowing the device to communicate with a personal area network wireless device or a local area network wireless router, a mobile communication transceiver 44 and corresponding antenna 46 allowing the device to communicate over a mobile/cellular network, and a global positioning system (GPS) transceiver 48 and corresponding antenna 49 allowing the device to obtain signals from a global positioning system or satellites. As shown, the memory 14 stores an access control logic module 62, and predetermined input criteria 64 for the touchscreen (gesture), camera (linger position) and pressure transducers (holding pattern).

Figure 2:
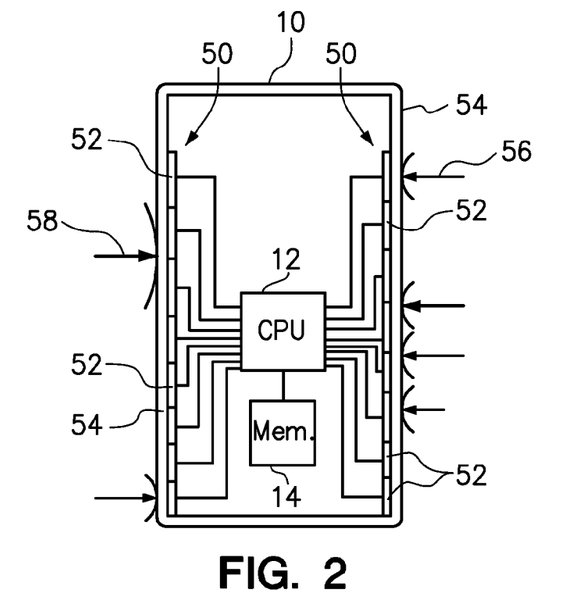
FIG. 2 is a schematic diagram of a mobile electronic device having a set of pressure transducers built into the edge of the device.

FIG. 2 is a schematic diagram of the mobile electronic device 10 having a pressure transducer set 50 built into the perimeter edge of the device and lined up along the edge. A flexible outer layer 54 protects the individual pressure transducers 52 from damage, but allows pressure to be applied to the transducers. Each individual pressure transducer 52 is electronically coupled to the processor 12, which detects a pressure reading from each pressure transducer 52 and stores the predetermined contact sensors input in the memory 14. The number of pressure transducers may vary, where a greater number provides more detailed input and a lesser number is presumable cheaper.

Figure 3:
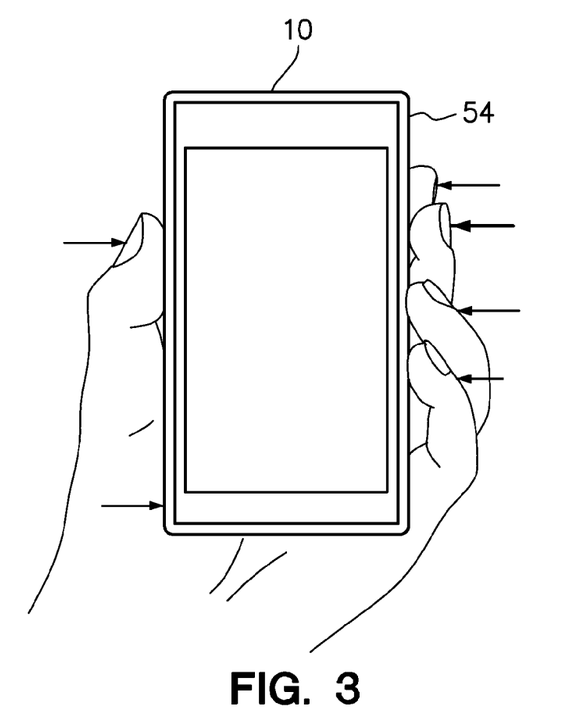
FIG. 3 is a diagram of a mobile electronic device being held by a user.

FIG. 3 is a diagram of the mobile electronic device 10 being held in the left hand of a user. Points of contact are shown and indicated by arrows. It is expected that these points of contact will be detected and measured by pressure transducers aligned with the points of contact.

Referring back to FIG. 2, these same points of contact are illustrated by similar arrows and the silhouettes of the fingers. A first arrow 56 illustrates a narrow contact point that applies a light pressure, whereas a second arrow 58 illustrates a broader contact point applying a heavier pressure. It should be recognized that the narrow contact point associated with the first arrow 56 may be sensed by a single contact sensor 52, the broader contact point associated with the second arrow 58 may be sensed by two or more contact sensors 52. Furthermore, where multiple adjacent contact sensors are contacted, the pressure may be unequally distributed among those contact sensors. The measurement at each contact sensor is stored as the predetermined contact sensors input criteria. The method will preferably allow for small variations in a user's hold pattern and pressure, but will not unlock the device if the input from the contact sensors is more than a predetermined deviation from the predetermined contact sensors input criteria.

Figure 4:
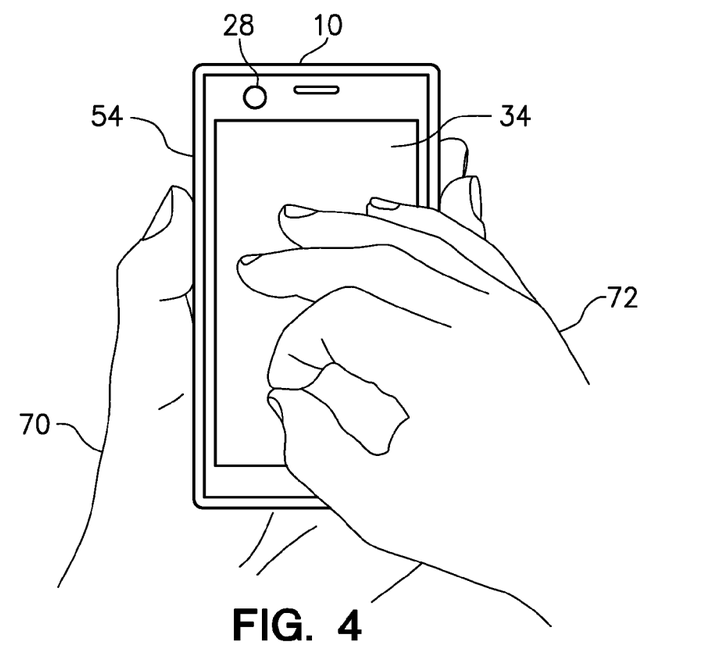
FIG. 4 is a diagram of the mobile electronic device with a user holding fingers in a predefined position while begin a multi-point touchscreen gesture.

FIG. 4 is a diagram of the mobile electronic device 10 with a user holding fingers in a predefined position while beginning a multi-point touchscreen gesture. Specifically, the user is holding the device 10 with the left hand 70, as shown in FIGS. 2 and 3, to produce contact sensor input. Furthermore, the user's right hand 72 is positioned along the touchscreen where a camera 28 can capture an image of the right hand 72. Specifically, the thumb and first finger of the right hand 72 are touching each other to form a finger position or pattern like a circle. The image captured by the camera 28 can be analyzed to determine the finger position, and determine whether the finger position meets the predetermined finger position input criteria. Still further, the third, fourth and fifth fingers (three fingers) of the right hand 72 are contacting the touchscreen 34 in preparation for inputting a touch gesture.

Figure 5:
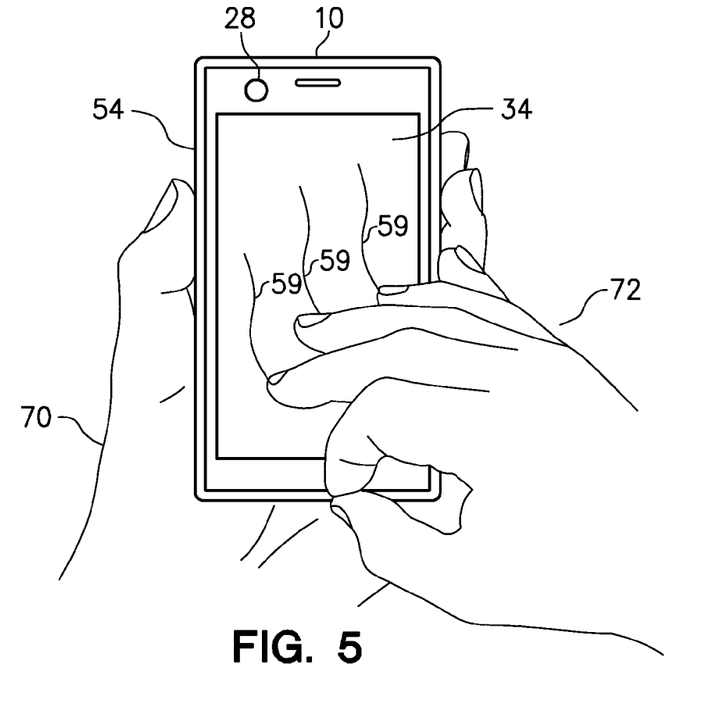
FIG. 5 is a diagram of the mobile electronic device as the user completes the multi-point touchscreen gesture.

FIG. 5 is a diagram of the mobile electronic device 10 as the user's right hand 72 completes a multi-point touchscreen gesture. Starting in the position shown in FIG. 4, the three fingers contacting the touchscreen 34 are slid over the surface of the touchscreen 34 in a pattern. This pattern is illustrated by the wavy lines 59 in FIG. 5. At this point the mobile electronic device 10 has received contact sensor input due to the left hand 72 holding the device and contacting the contact sensors behind the flexible outer layer 54. The device 10 has also received finger position input from the camera image of the fingers on the right hand 72. Furthermore, the device 10 has received touch gesture input from the touchscreen. These inputs may be used during a security configuration mode to establish the predetermined contact sensors input criteria, predetermined finger position criteria, and predetermined touchscreen input criteria. Furthermore, these same inputs may be subsequently use to authenticate a user attempting to unlock the device 10 by comparing the combination of inputs with the combination of predetermined input criteria.

Figure 6:
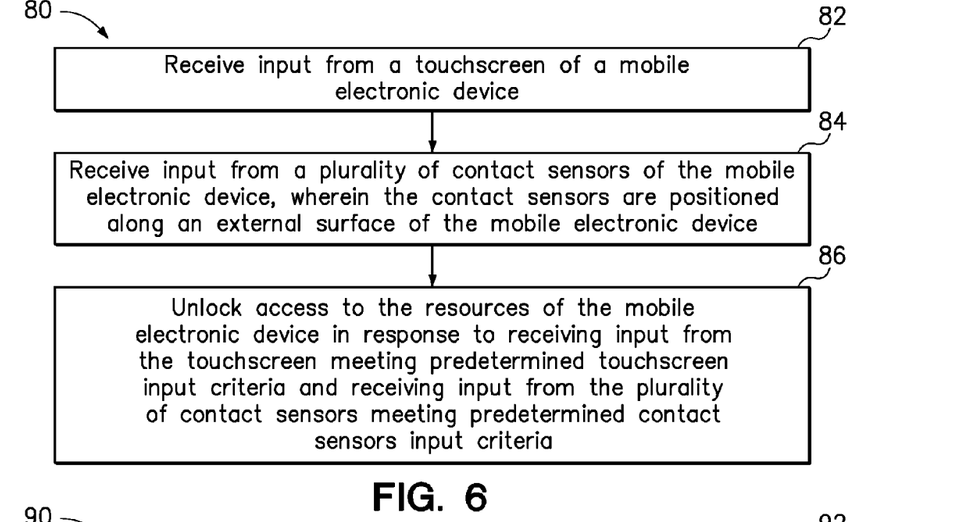
FIG. 6 is a flowchart of a method in accordance with a first embodiment of the present invention.

FIG. 6 is a flowchart of a method 80 in accordance with a first embodiment of the present invention. In step 82, the method receives input from a touchscreen of a mobile electronic device. In step 84, the method receives input from a plurality of contact sensors of the mobile electronic device, wherein the contact sensors are positioned along an external surface of the mobile electronic device. The method then, in step 86, unlocks access to the resources of the mobile electronic device in response to receiving input from the touchscreen meeting predetermined touchscreen input criteria and receiving input from the plurality of contact sensors meeting predetermined contact sensors input criteria.

Figure 7:
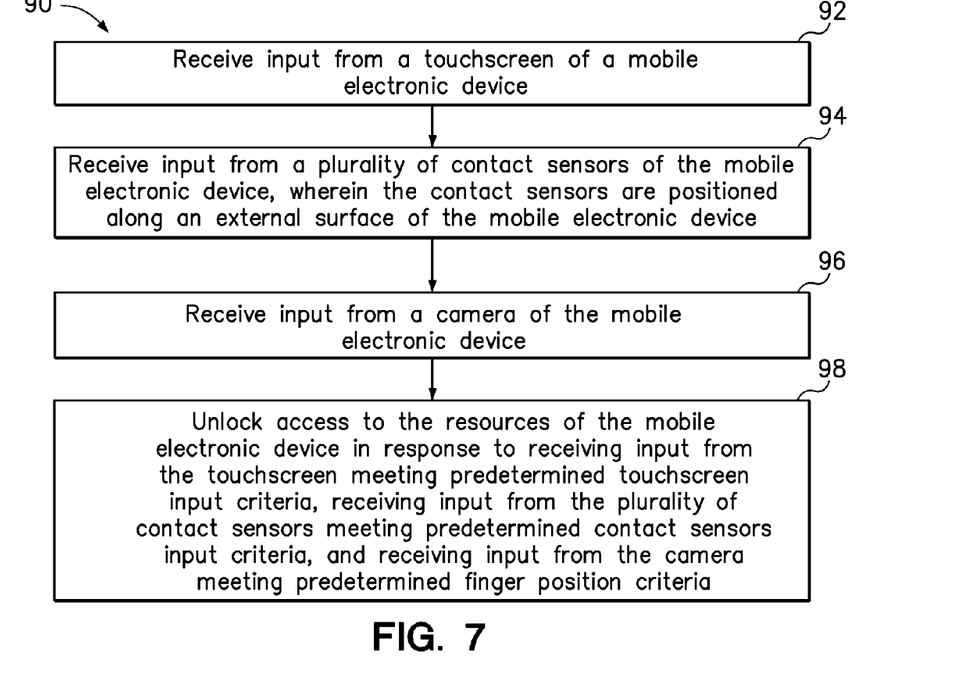
FIG. 7 is a flowchart of a method in accordance with a second embodiment of the present invention.

FIG. 7 is a flowchart of a method 90 in accordance with a second embodiment of the present invention. In step 92, the method receives input from a touchscreen of a mobile electronic device. In step 94, the method receives input from a plurality of contact sensors of the mobile electronic device, wherein the contact sensors are positioned along an external surface of the mobile electronic device. Furthermore, in step 96, the method receives input from a camera of the mobile electronic device. The method then, in step 98, unlocks access to the resources of the mobile electronic device in response to receiving input from the touchscreen meeting predetermined touchscreen input criteria, receiving input from the plurality of contact sensors meeting predetermined contact sensors input criteria, and receiving input from the camera meeting predetermined finger position criteria.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith, the program instructions executable by a processor to cause the processor to perform a method comprising:

placing a mobile electronic device in a security configuration mode;

during the security configuration mode, receiving input from an authorized user holding the mobile electronic device in a manner that engages a plurality of the contact sensors and performing a touch gesture on the touchscreen;

storing the touch gesture received during the security configuration mode as predetermined touchscreen input criteria and the contact sensor input received during the security configuration mode as predetermined contact sensors input criteria;

receiving input from the touchscreen of the mobile electronic device;

receiving input from the plurality of contact sensors of the mobile electronic device, wherein the contact sensors are pressure transducers positioned along an external surface of the mobile electronic device; and unlocking access to the resources of the mobile electronic device in response to receiving input from the touchscreen meeting the predetermined touchscreen input criteria and receiving input from the plurality of contact sensors meeting the predetermined contact sensors input criteria.

2. The computer program product of claim 1, wherein the predetermined touchscreen input criteria includes a predetermined touch gesture.

3. The computer program product of claim 1, wherein the predetermined touchscreen input criteria includes a predetermined touch gesture in a predetermined position of the touchscreen.

4. The computer program product of claim 1, wherein the predetermined touchscreen input criteria includes a predetermined multi-touch gesture.

5. The computer program product of claim 1, wherein the predetermined touchscreen input criteria includes a predetermined multi-touch gesture in a predetermined position of the touchscreen.

6. The computer program product of claim 1, wherein the predetermined contact sensors input criteria is a predefined device holding pattern.

7. The computer program product of claim 1, the method further comprising:

unlocking access to a subset of the resources of the mobile electronic device in response to receiving input from the touchscreen meeting second predetermined touchscreen input criteria and receiving input from the plurality of contact sensors meeting second predetermined contact sensors input criteria.

8. A computer program product comprising a non-transitory computer readable storage medium having program instructions embodied therewith, the program instructions executable by a processor to cause the processor to perform a method comprising:

placing a mobile electronic device in a security configuration mode;

during the security configuration mode, receiving input from an authorized user holding the mobile electronic device in a manner that engages a plurality of contact sensors, performing a touch gesture on a touchscreen of the mobile electronic device, and positioning fingers in view of a camera of the mobile electronic device;

storing input received from the contact sensors during the security configuration mode as the predetermined contact sensors input criteria, storing the input received from the touchscreen during the security configuration mode as the predetermined touchscreen input criteria, and storing the input received from the camera during the security configuration mode as the predetermined finger position criteria;

receiving touch gesture input from the touchscreen of the mobile electronic device;

receiving input from the plurality of contact sensors of the mobile electronic device, wherein the contact sensors are pressure transducers positioned along an external surface of the mobile electronic device;

receiving input from the camera of the mobile electronic device, wherein the camera captures an image of the relative position of fingers during the touch gesture input; and unlocking access to resources of the mobile electronic device in response to receiving input from the touchscreen meeting predetermined touchscreen input criteria, receiving input from the plurality of contact sensors meeting predetermined contact sensors input criteria, and receiving input from the camera meeting predetermined finger position criteria.

9. The computer program product of claim 8, wherein the predetermined touchscreen input criteria includes a predetermined touch gesture.

10. The computer program product of claim 8, wherein the predetermined touchscreen input criteria includes a predetermined touch gesture in a predetermined position of the touchscreen.

11. The computer program product of claim 8, wherein the predetermined touchscreen input criteria includes a predetermined multi-touch gesture.

12. The computer program product of claim 8, wherein the predetermined touchscreen input criteria includes a predetermined multi-touch gesture in a predetermined position of the touchscreen.

13. The computer program product of claim 8, wherein the predetermined contact sensors input criteria is a predefined device holding pattern.

14. The computer program product of claim 8, wherein the plurality of contact sensors are pressure transducers.

15. The computer program product of claim 8, wherein the predetermined finger position criteria includes a predetermined configuration of fingers not involved in the predetermined touchscreen gesture.

16. The computer program product of claim 8, the method further comprising:

using image analysis on the input from the camera to identify the finger position.

* * * * *